(12) United States Patent
Pong et al.

(10) Patent No.: US 7,475,176 B2
(45) Date of Patent: Jan. 6, 2009

(54) HIGH BANDWIDTH SPLIT BUS

(75) Inventors: Fong Pong, Mountain View, CA (US); Lief O'Donnell, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 336 days.

(21) Appl. No.: 11/344,411

(22) Filed: Jan. 31, 2006

(65) Prior Publication Data
US 2007/0180176 A1    Aug. 2, 2007

(51) Int. Cl.
*G06F 13/00* (2006.01)
(52) U.S. Cl. ............ 710/107; 710/33; 710/61; 710/110; 710/106
(58) Field of Classification Search ......... 710/107–112, 710/316–317, 37–40, 20–22; 370/423
See application file for complete search history.

(56) References Cited
U.S. PATENT DOCUMENTS

| | | | | |
|---|---|---|---|---|
| 5,701,422 A | * | 12/1997 | Kirkland et al. ............. | 710/310 |
| 5,897,667 A | * | 4/1999 | Miller et al. ................ | 711/218 |
| 6,801,977 B2 | * | 10/2004 | Drerup et al. ............... | 710/311 |
| 6,823,410 B2 | * | 11/2004 | Koike ......................... | 710/107 |
| 7,305,510 B2 | * | 12/2007 | Miller ........................ | 710/305 |

* cited by examiner

*Primary Examiner*—Raymond N Phan
(74) *Attorney, Agent, or Firm*—Brake Hughes Bellermann LLP (57) ABSTRACT

A system includes a first bus segment and a second bus segment. The first bus segment is operatively coupled to one or more first bus agents, where the first bus agents are configured for writing messages to the first bus segment and reading messages from the first bus segment and the second bus segment, which is separate from the first bus segment, is operatively coupled to one or more second bus agents. The first bus agents are configured for writing messages to the first bus segment and reading messages from the first bus segment. The system also includes first electrical circuitry operably coupled to the first bus segment and the second bus segment and configured to read messages written on the first bus segment and to write the messages onto the second bus segment and second electrical circuitry operably coupled to the first bus segment and the second bus segment and configured to read messages written on the second bus segment and to write the messages onto the first bus segment.

28 Claims, 7 Drawing Sheets

HIGH BANDWIDTH SPLIT BUS

TECHNICAL FIELD

This description relates to managing data flow among multiple, interconnected bus agents and, in particular, to a cache coherent split bus.

BACKGROUND

Computer chips can contain multiple computing cores, memories, or processors, and these elements can communicate with each other while the chip performs its intended functions. In some computer chips, individual computer core elements may contain caches to buffer data communication with memories. When the memory is shared among the computing cores, the data held in each individual core cache can be maintained in a coherent manner with other core caches and with the shared memory.

This coherence among the cache cores can be maintained by connecting the communicating elements in a shared bus architecture in which the shared bus includes protocols for communicating any changes in the contents of one cache to the contents of any of the caches. However, the speed at which such a shared bus can operate to communicate information among the agents connected to the bus is generally limited due to electrical loading of the bus, and this limitation generally become more severe as more agents are added to the shared bus. As processor speeds become faster and the number of shared elements increases, limitations on the communication speed on the bus impose undesirable restrictions on the overall processing capability of the chip.

SUMMARY

In a first general aspect, there is a method of managing data traffic among first bus agents operably coupled to an associated first bus segment and second bus agents operably coupled to an associated second bus segment separated from the first bus segment. The method includes generating a common clock signal, triggering the first bus agents and the second bus agents to write messages to their associated bus segments, transferring messages written to the first bus segment to the second bus segment, and transferring messages written to the second bus segment to the first bus segment. Messages on the first bus segment are read into the first bus agents and messages on the second bus segment are read into the second bus agents. Messages read into the first and second bus agents are processed in an identical order.

Implementations may include one or more of the following features. For example, triggering the first bus agents and the second bus agents to write messages can occur during a first parity of the clock signal and transferring messages written to the first bus segment to the second bus segment and transferring messages written to the second bus segment to the first bus segment can occur during a second parity of the clock signal. Reading messages on the first or second bus segment into a bus agent associated with the first or second bus segment can include receiving messages written by bus agents associated with the first or second bus segment into a first queue and receiving messages written by bus agents associated with the first or second bus segment into a second queue. Messages can be received into the first and second queues during alternating cycles of the clock signal. Messages can be read out of the first and second queues during alternating cycles of the clock signal.

Triggering the first bus agents to write messages can occur during a first parity of the clock signal and triggering the second bus agents to write messages can occur during a second parity of the clock signal. The order of messages written to and transferred to the first bus segment can be arbited, and if a first bus agent is triggered to write a message to the first bus segment during the same cycle of the clock signal when a message is transferred to the first bus segment, the message transferred to the first bus segment can be placed on the first bus segment.

Messages can be transferred from the first bus segment to the second bus segment during cycles of the clock signal that succeed cycles of the clock signal in which the first bus agents are triggered to write the messages to the first bus segment. At least one first bus agent and at least one second bus agent comprises a processor and a local cache, and the bus agents can be located in a system-on-a-chip.

In another general aspect, a system includes a first bus segment and a second bus segment. The first bus segment is operatively coupled to one or more first bus agents, where the first bus agents are configured for writing messages to the first bus segment and reading messages from the first bus segment and the second bus segment, which is separate from the first bus segment, is operatively coupled to one or more second bus agents. The first bus agents are configured for writing messages to the first bus segment and reading messages from the first bus segment. The system also includes first electrical circuitry operably coupled to the first bus segment and the second bus segment and configured to read messages written on the first bus segment and to write the messages onto the second bus segment and second electrical circuitry operably coupled to the first bus segment and the second bus segment and configured to read messages written on the second bus segment and to write the messages onto the first bus segment.

Implementations may include one or more of the following features. The system can be located on a system-on-a-chip. Each bus agent can include a processor and a local cache. The system can include a main memory operably coupled to the first bus segment and the second bus segment. The first and second bus agents can be configured for writing messages during alternating clock cycles.

The system can also include a first arbiter operably coupled to the first bus agents and to the first bus segment, where the arbiter is configured to for determining an order of messages written to the first bus segment and a second arbiter operably coupled to the second bus agents and to the second bus segment, where the arbiter is configured to for determining an order of messages written to the first bus segment.

The first bus agents can include an even queue configured for receiving messages written by the first bus agents and an odd queue configured for receiving messages written by the second electrical circuitry, and the second bus agents can include an odd queue configured for receiving messages written by the second bus agents and an even queue configured for receiving messages written by the first electrical circuitry, and the first and second bus segments can include electrical circuitry configured for outputting messages from the odd and even queues during alternating clock cycles. Each of the first bus agents can include electrical circuitry configured for placing messages read from the first bus segment in an order for processing, and each of the second bus agents can include electrical circuitry configured for placing messages read from the second bus segment in the same order for processing. Lengths of the first and second bus segments are identical to within about 10 percent.

The details of one or more implementations are set forth in the accompanying drawings and the description below. Other features will be apparent from the description and drawings, and from the claims.

DETAILED DESCRIPTION

Figure 1:
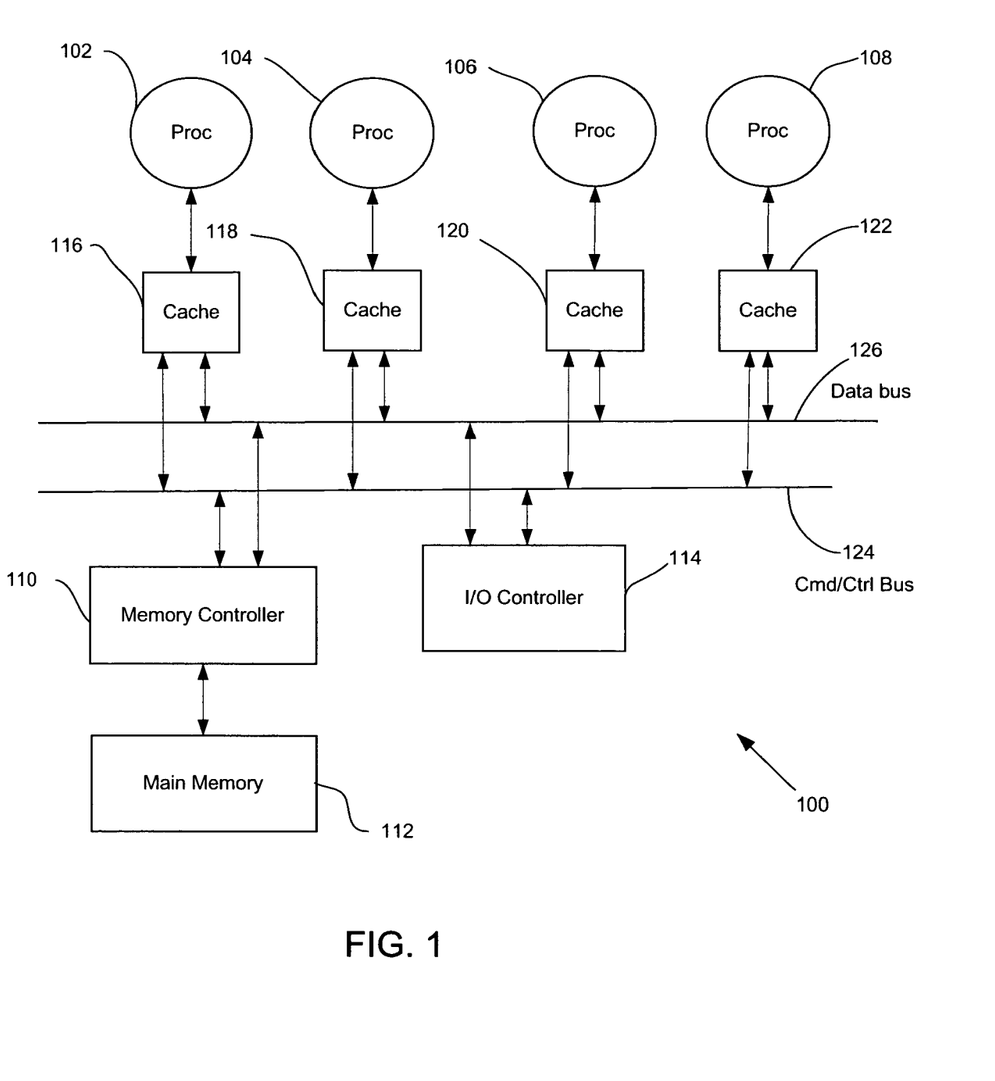
FIG. 1 is a block diagram of a system on a single integrated circuit having multiple processors that are connected by a bus.

FIG. 1 is a block diagram of a multi-core System on a Chip ("SOC"). The chip 100 includes four processing elements 102, 104, 106, and 108. Each of the processing elements can be a central processing unit ("CPU") core, a digital signal processor ("DSP"), or another data processing module. The various processing elements 102, 104, 106, and 108 may be identical or different. For example, all of the processing elements 102, 104, 106, and 108 can be DSPs, or one may be a standard CPU core, while others may be specialized DSP cores.

The processing elements 102, 104, 106, and 108 are connected to a memory controller 110 that controls access to a main memory 112 (e.g., a high speed random access memory ("RAM")). The processing elements 102, 104, 106, and 108 also are connected to an input/output (I/O) processor 114 that manages input and output operations between the processing elements and external devices. For example, the I/O processor 114 may handle communications between the processing elements 102, 104, 106, and 108 and an external disk drive.

Each processing element 102, 104, 106, and 108 can be associated with a cache element 116, 118, 120, and 122, respectively, which buffers data exchanged with the main memory 112. Cache elements 116, 118, 120, and 122 are commonly used with processing elements 116, 118, 120, and 122 because the processing speed of the processing elements 102, 104, 106, and 108 is generally much faster than the speed of accessing the main memory 112. With the cache elements 116, 118, 120, and 122, data can be retrieved from memory 112 in blocks and stored temporarily in a format that can be accessed quickly in the cache elements 116, 118, 120, and 122, which are located close to the associated processing elements 102, 104, 106, and 108. The processing elements 102, 104, 106, and 108 then can access data from their associated cache elements 116, 118, 120, and 122, more quickly than if the data had to be retrieved from the main memory 112.

Communications between the processing elements 102, 104, 106, and 108, the cache elements, 116, 118, 120, and 122 and the main memory 112 generally occur over a shared bus, which can include an address and command bus 124 and a data bus 126. Although the address and command bus 124 and the data bus 126 are shown separately, in some implementations they can be combined into one physical bus. Regardless of whether the shared bus is implemented as a dual bus or a single bus, a set of protocols can be used to govern how individual elements 102-122 that are connected to the bus (i.e., "bus agents") use the bus to communicate amongst themselves.

In many cases during operation of the chip 100 the processors 102, 104, 106, and 108 operate on the same data, in which case the copy of the data retrieved from the main memory 112 and stored in the local cache element 116 associated with a processing element 102 must be identical to the copy stored in the local cache 118, 120, and 122 associated with all other processing elements 104, 106, and 108. Thus, if one processing element modifies data stored in its local cache, this change must be propagated to the caches associated with the other processing elements, so that all processing elements will continue to operate on the same common data. Because of this need for cache coherence among the bus agents, protocols are established to ensure that changes to locally-stored data made by an individual bus agent to its associated cache are communicated to all other caches associated with other bus agents connected to the bus.

Figure 2:
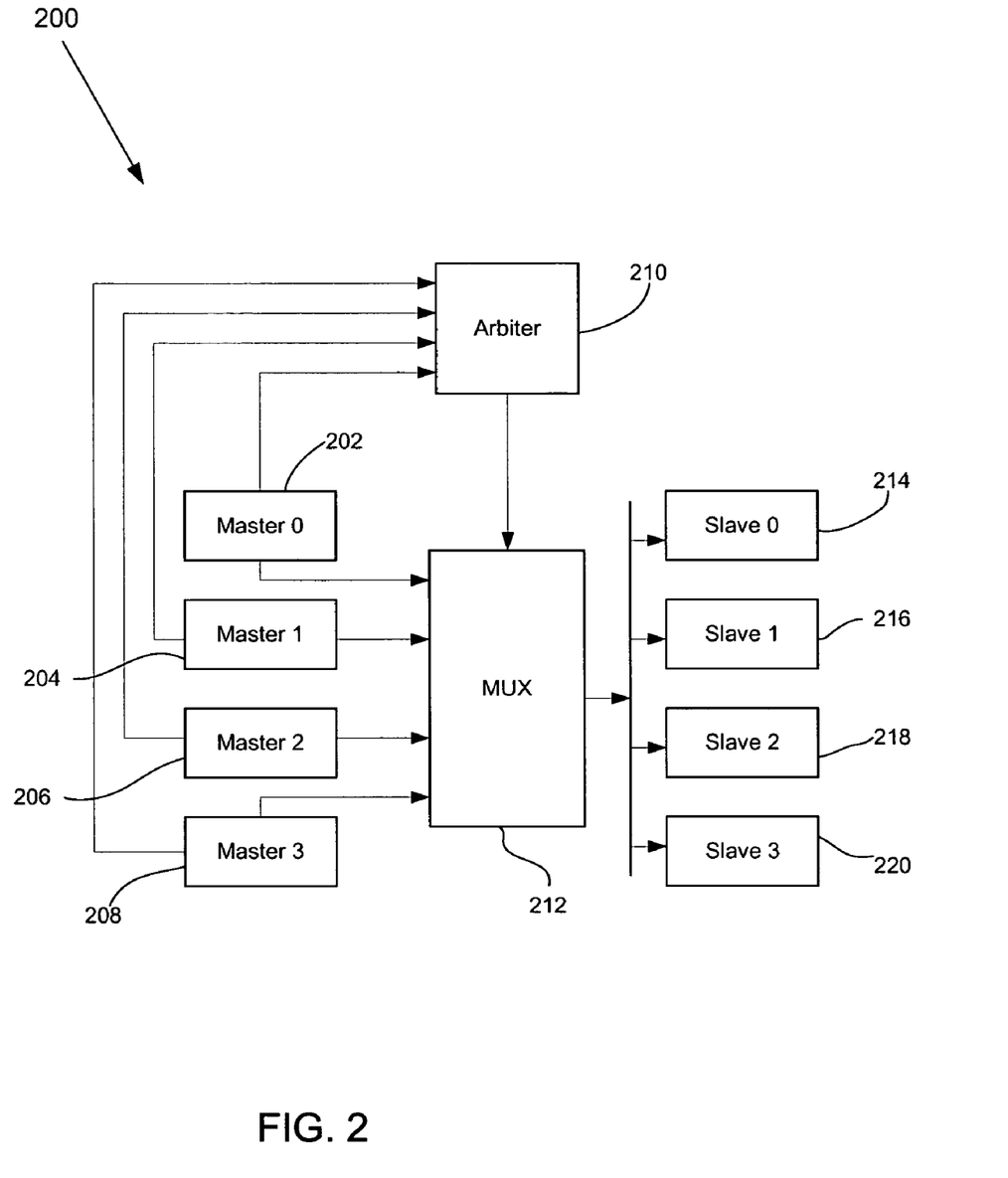
FIG. 2 is a block diagram of a shared bus implementation.

FIG. 2 is a block diagram of a shared bus implementation 200 for maintaining a cache coherence among multiple bus agents. The shared bus includes four bus "master" elements 202, 204, 206, and 208 (e.g., cache controllers corresponding to each cache 116, 118, 120, and 122), a multiplexer 212, and arbiter 210, and four "slave" elements 214, 216, 218, and 220. When a bus master needs to communicate a message on the bus (e.g., a command to alter data stored in the local cache of the bus agents), the master sends an input message to the multiplexer 212 and also sends a request signal to the bus arbiter 210 that controls a multiplexer 212. The multiplexer 212 can receive input messages from the master elements 202, 204, 206, and 208 in a particular order, and the multiplexer 212 can then output the messages to the slave elements 214, 216, 218, and 220 in a particular order, which need not be the same as the order in which the messages were received from the master elements. The arbiter 210 controls, via the multiplexer 212, which of the bus master's signal is placed on the bus at a particular time. If the multiplexer 212 receives more than one request for access to the bus, the arbiter 210 decides the order in which the requests are honored, and the output of the multiplexer 212 is sent to one or more bus slave elements 214, 216, 218, and 220, which can be separate elements or part of a receiving side of one of the bus masters 202, 204, 206, and 208.

The shared bus 200 shown in FIG. 2 can be used in computer systems, for example, to control a Peripheral Component Interconnect ("PCI") bus, which is used in many personal computers. However, such bus arbiter systems operate at relatively low speeds due to the need for the complex logic associated with the bus arbiter, and therefore generally are not used as part of a SOC type of chip.

Figure 3:
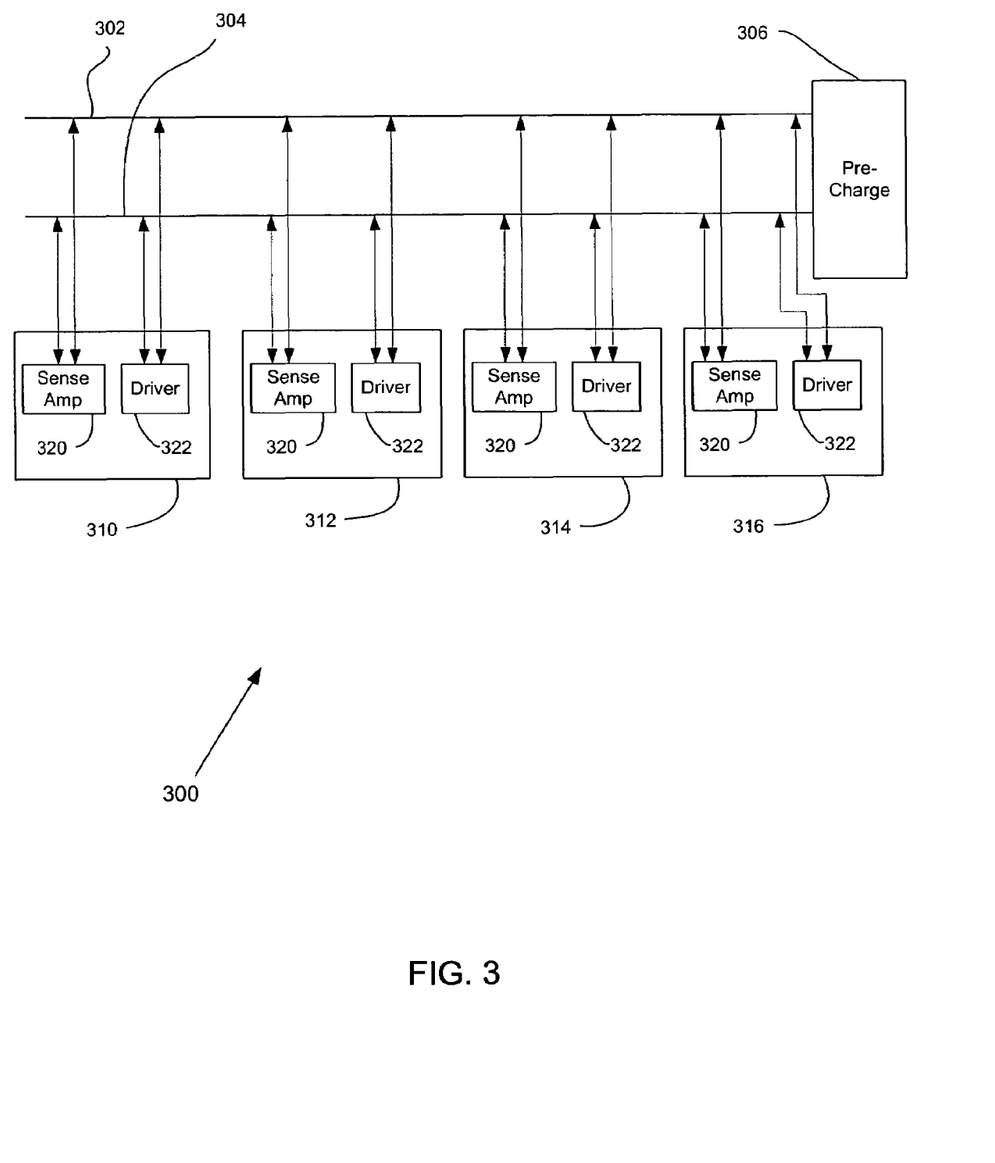
FIG. 3 is a block diagram of another shared bus implementation.

As shown in FIG. 3, another shared bus configuration 300 can be used to operate a bus at relatively high speeds. The shared bus controller configuration 300 can include a differential signaling system that uses two bus lines 302 and 304 to carry messages between bus agents 310, 312, 314, and 316. The bus lines 302 and 304 are pre-charged by a circuit element 306 (e.g., a battery or a capacitor) that ensures that the two bus lines 302 and 304 are charged to a predetermined initial state. Each bus agent 310, 312, 314, and 316 connected to the bus lines 302 and 304 of the bus can have two circuit elements connected to bus line: a driver 322 that places signals on the lines 302 and 304; and a sense amp 320 that detects signals on the bus. Although only one pair of lines 302 and 304 is shown in FIG. 3, other implementations could use a larger number of lines (e.g., 32, 64, or 128 pairs of bus lines, or even more) in parallel to allow for high data transfer rates between the bus agents 310, 312, 314, and 316.

When a bus agent 310 needs to communicate information to other bus agents 312, 314, and 316 on the bus, the bus agent 310 activates its driver 322, which changes the state of the charge on lines 302 and 304, for example, by drawing charge away from the lines 302 and 304, thus causing a voltage pulse to travel along the lines. The other bus agents 312, 314, and 316 sense the change of state using their sense amp circuits 320. Communication between the bus agents 310, 312, 314, and 316 generally occurs by including in the message placed on the bus information that identifies both the sending bus agent 310 and possibly the one or more bus agents 312, 314, and 316 that are intended to receive the message. Not shown in FIG. 3 is the complex logic that ensures that only one bus agent 310, 312, 314, and 316 at a time is able to place information on the bus lines 302 and 304 and the logical elements that process the information that is placed on the bus lines 302 and 304.

Although messages may be communicated on the bus lines 302 and 304 at high speeds in typical integrated circuit implementations, the speed of the bus can be limited due to electrical loading of the lines. In particular, as the bus lines 302 and 304 become longer, the resistance, R, of the wires that make up the bus increases. In addition, the capacitance, C, of the bus wires with respect to their environment also increases with increasing length of the bus lines 302 and 304. Therefore, the RC time constant of the bus increases with the length of the bus lines, which limits the speed at which messages can be communicated on the bus. In fact, the RC time constant of the bus generally increases in proportion to the square of the bus length. As more agents are added to the bus and the bus becomes longer, this speed limitation can come to limit the overall operation speed of the bus. The trend of placing more than one processing core on a single chip (e.g., in a SOC configuration) and connecting the cores by a common bus places further emphasis on overcoming or mitigating bus speed limitations due to electrical loading as the number of processing agents on the bus increases.

Figure 4:
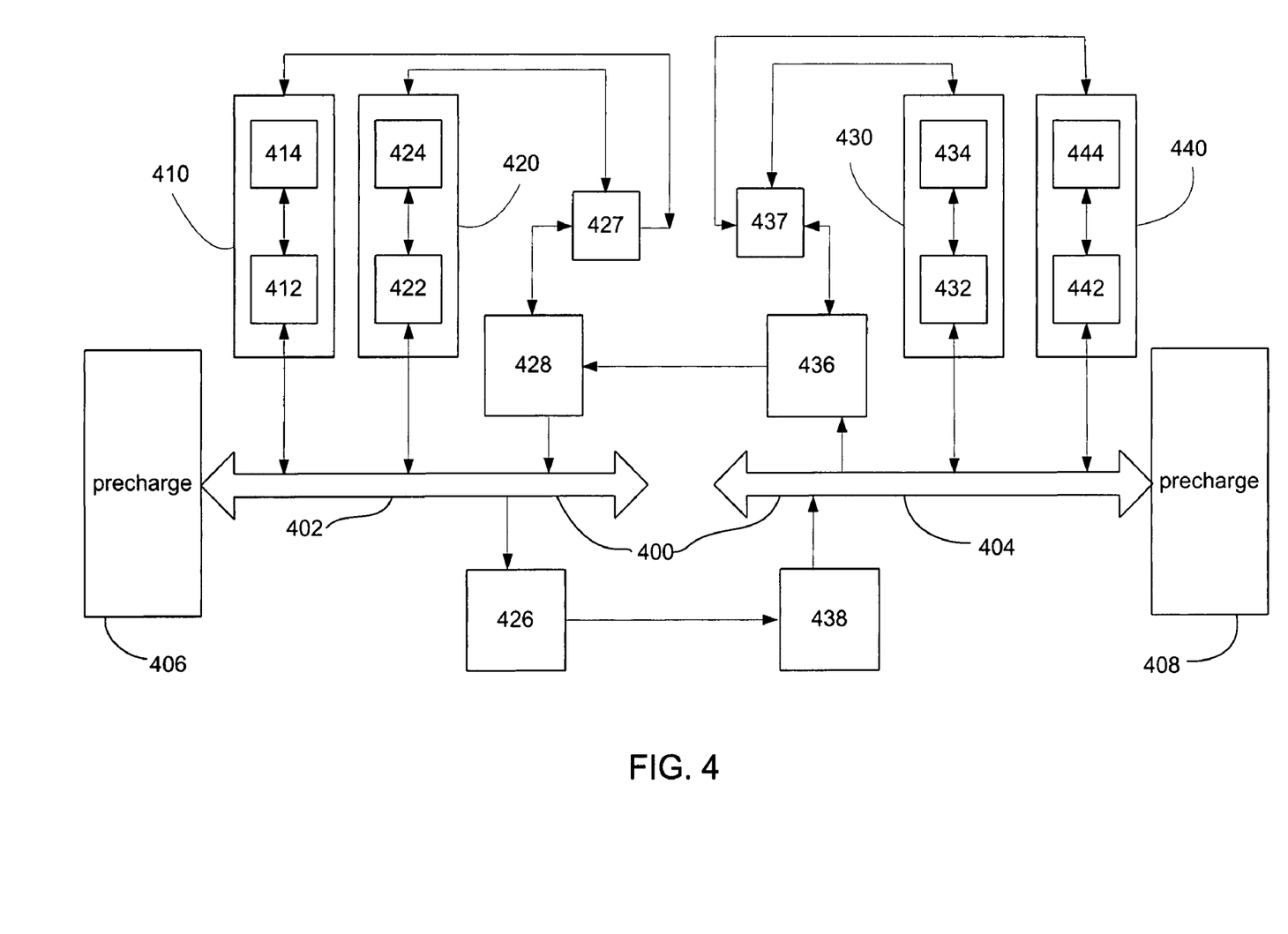
FIG. 4 is a block diagram of a system on a single integrated circuit having multiple processors that are connected by a split bus.

Referring to FIG. 4, a common bus 400 for carrying messages between several bus agents and that is split into two segments 402 and 404 can be used to lower the effective electrical loading on the bus and thereby increase the speed of operation of the bus. A precharge unit 406 can be connected to segment 402, and the precharge unit can be used to load the segment 402 with charge. In one implementation, once the segment is charged, a message can be communicated between a processing unit 414 of a bus agent 410 and a processing unit 424 of another bus agent 420, where the bus agents 410 and 420 are both connected to the segment 402. The processing units 414 and 424 are connected to the bus segment 402 through bus interface units ("BIU") 412 and 422, respectively. Similarly, on the other bus segment 404, a precharge unit 408 can be connected to segment 404, and the precharge unit can be used to load the segment 404 with charge. Once the segment 404 is charged, a message can be communicated between bus agents 430 and 440 that are connected to the segment 404. The processing units 434 and 444 of agents 430 and 440, respectively, can be connected to the bus segment 404 through bus interface units BIU 432 and 442, respectively.

Electrical circuitry in a sense amp 426 can be connected to the bus segment 402 and can drive electrical circuitry in a driver 438 connected to bus segment 404, while a electrical circuitry in a sense amp 436 and a driver 428 similarly connects bus segment 404 to bus segment 402. Using the connected pair of the sense amp 426 and the driver 438, messages placed on bus segment 402 by BIUs 412 and 422 can be sensed by sense amp 426 and then placed on bus segment 404 by driver 438. Similarly, messages placed on bus segment 404 by BIUs 432 and 442 can be sensed by the sense amp 436 and then placed on bus segment 402 by the driver 428. Thus, the combination of sense amp 426 and driver 438 can convey information on bus segment 402 to bus segment 404, while the combination of sense amp 436 and driver 428 can convey information on bus segment 404 to bus segment 402. In this manner all bus agents 410, 420, 430, and 440 can communicate with each other regardless of whether they are connected to bus segment 402 or 404. The bus agents 410 and 420 and the driver 428 can be operatively coupled to an arbiter 427 that resolves conflicts in case two bus agents or a bus agent and the driver connected to segment 402 attempt to write a message to the bus segment during the same clock cycle. In case of such a conflict the arbiter 427 determines which bus agent 410 or 420 or driver 428 will write to the segment 402. Similarly, an arbiter 437 resolves conflicts between bus agents 430 and 440 and driver 438. Bus segments 402 and 404 can include one or more lines (e.g., 32, 64, or 128 pairs of bus lines, or even more) arranged in parallel to allow for high data transfer rates between the bus agents 410, 420, 430, and 440 that are connected to the segments 402 and 404.

Segments 402 and 404 can be equal length segments or can differ in length. In the case when the length of segments 402 and 404 is identical, each segment 402 and 404 can be clocked at up to four times as fast as the maximum speed of a single bus of twice the length of a single segment 402 or 404 because the limiting RC time constant of a bus or bus segment is proportional to the square of the length of the bus or bus segment, so halving the bus length reduces the RC time constant by a factor of four. The actual improvement may be less than a factor of four due to loading of the bus by the BIUs 412, 422, 432, and 442, because each BIU adds some resistance and capacitance to the distributed resistance and capacitance of the bus segment itself. However, even with the resistive and capacitive loading due to the BIUs, each bus segment 402 and 404 can be clocked faster than a bus having twice the length of a segment 402 or 404, which permits a bus bandwidth that in a worst case scenario is at least equal to the bandwidth of a longer bus having twice the length of a segment 402 or 404, and in most cases can be more than twice as high.

Although the two segment bus arrangement shown in FIG. 4 allows a faster clocking of the combined split bus 400 when using a single longer bus, additional steps can be taken to maintain cache coherence between the bus agents 410, 420, 430, and 440 on the two segments of the bus. Because of the propagation delays in the sense amp-driver elements 426 and 438 for communicating messages from segment 402 to segment 404 and in the sense amp-driver elements 436 and 428 for communicating messages from segment 404 to segment 402, the order of messages received at a bus agent 422 or 424 on segment 402 may not necessarily be the same as the order of messages received at a bus agent 442 or 444 on segment 404. Therefore, to maintain cache coherence between all bus agents connected to both bus segments of the split bus 400, the BIU's 412, 422, 432, and 442 can include additional processing capability to ensure cache coherence among the bus agents.

Figure 5:
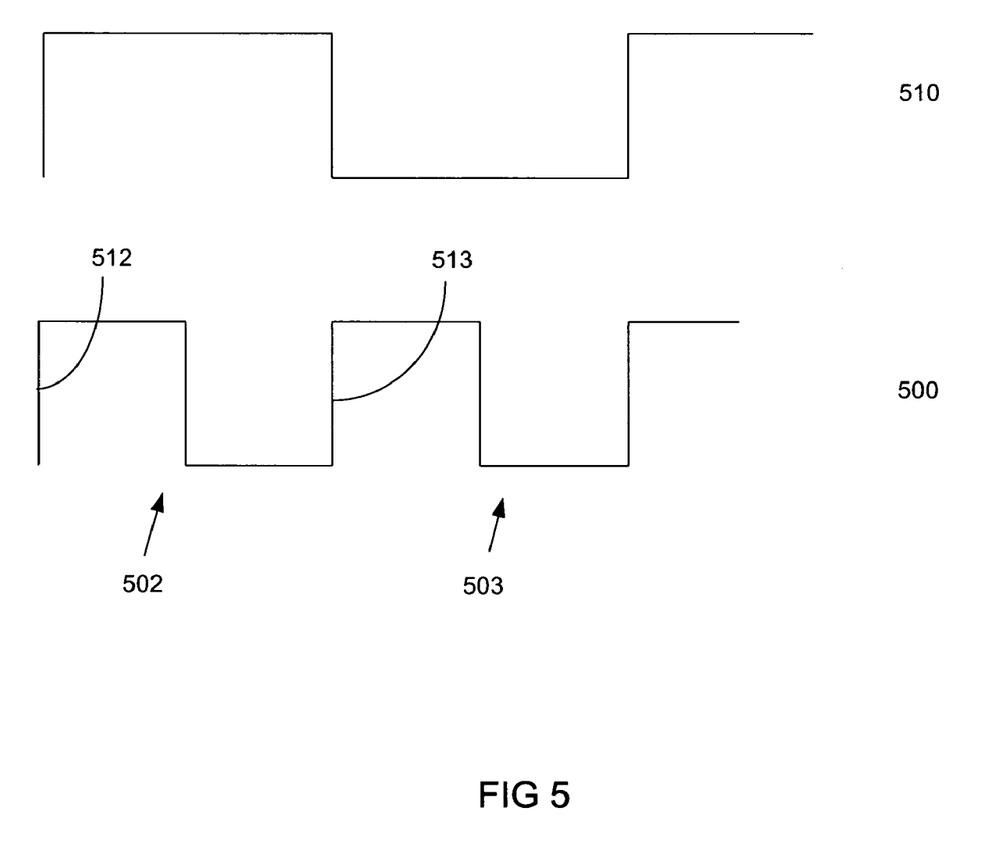
FIG. 5 is a block diagram of clock signals for use in the split bus.

FIG. 5 shows an arrangement of clock signals that can be part of a protocol used to ensure that cache coherence is maintained on the split bus 400. A CLOCK signal 500 can be divided into complete clock cycles from low to high and back to low. The parity of the clock cycles can be odd or even, where the parity alternates between successive cycles of the CLOCK signal 500. Thus, a clock cycle 502 has odd parity, and clock cycle 503 has even parity. The CLOCK signal 500 can also be used to generate a half speed CLOCK2 signal 510, which can be used to identify the odd and even parity cycles of the clock signal 500. For example, the half-speed CLOCK2 signal 510 being in a high state can indicate that the CLOCK signal 500 is in an odd cycle, while the CLOCK2 signal 510 being in a low state can indicate that the CLOCK signal 500 is in an even cycle. The combined clocks signal shown in FIG. 5 can be used in a communications discipline to ensure cache coherence between the bus agents on the two halves of the split bus.

In one implementation, writing of messages to the bus segments 402 and 404 by BIUs 412, 422, 432, and 442 occurs during the odd parity cycles 502 of the clock signal 500. Then during even parity clock cycles 503 of the CLOCK signal 500 the combination of the sense amp 426 and the driver 438 propagates messages from bus segment 402 to bus segment 404, and the combination of the sense amp 428 and the driver 436 propagates messages from bus segment 404 to bus segment 402. Thus, during odd parity cycles BIUs connected with to the same bus segment communicate messages to each other, while during even parity cycles BIUs on one segment receive messages that were written by BIUs connected to the other segment. In this case, the bus utilization may be relatively low because half of the bus bandwidth is reserved for the drivers 428 and 438 to relay messages between bus segments, which can cause idle bus cycles. Nevertheless, the overall bandwidth of the bus 400 can be higher than that of a single bus because of the lower RC time constant of the split bus 400.

In another implementation, arbiters 427 and 437 schedule the writing of messages to the bus segments 402 and 404 by BIUs 412, 422, 432, and 442 and drivers 428 and 438. BIUs 412, 422, 432, and 442 can make a request to write messages to bus segments 402 and 404 during any cycles of CLOCK signal 500. However, when a new message is placed on bus segment 402, the driver 438 must deliver the message to bus segment 404 in the next cycle, and when a new message is placed on bus segment 404, the driver 428 must deliver the message to bus segment 402 in the next cycle. This is achieved by configuring the arbiters 427 and 437 such that when resolving conflicts between a driver 428 or 438 and another bus agent, each of which attempts to write a message to its bus segment, the drivers 428 and 438 have higher priority than any other agent. Thus, if a bus agent 410 or 420 tries to place a message on segment 402 during the same cycle that driver 428 tries to place a message on the segment, which has already been written onto the other segment 404 of the split bus, the arbiter 427 will always resolve the conflict in favor of the driver 428. In this way, the bus bandwidth can be maximally utilized.

Figure 6:
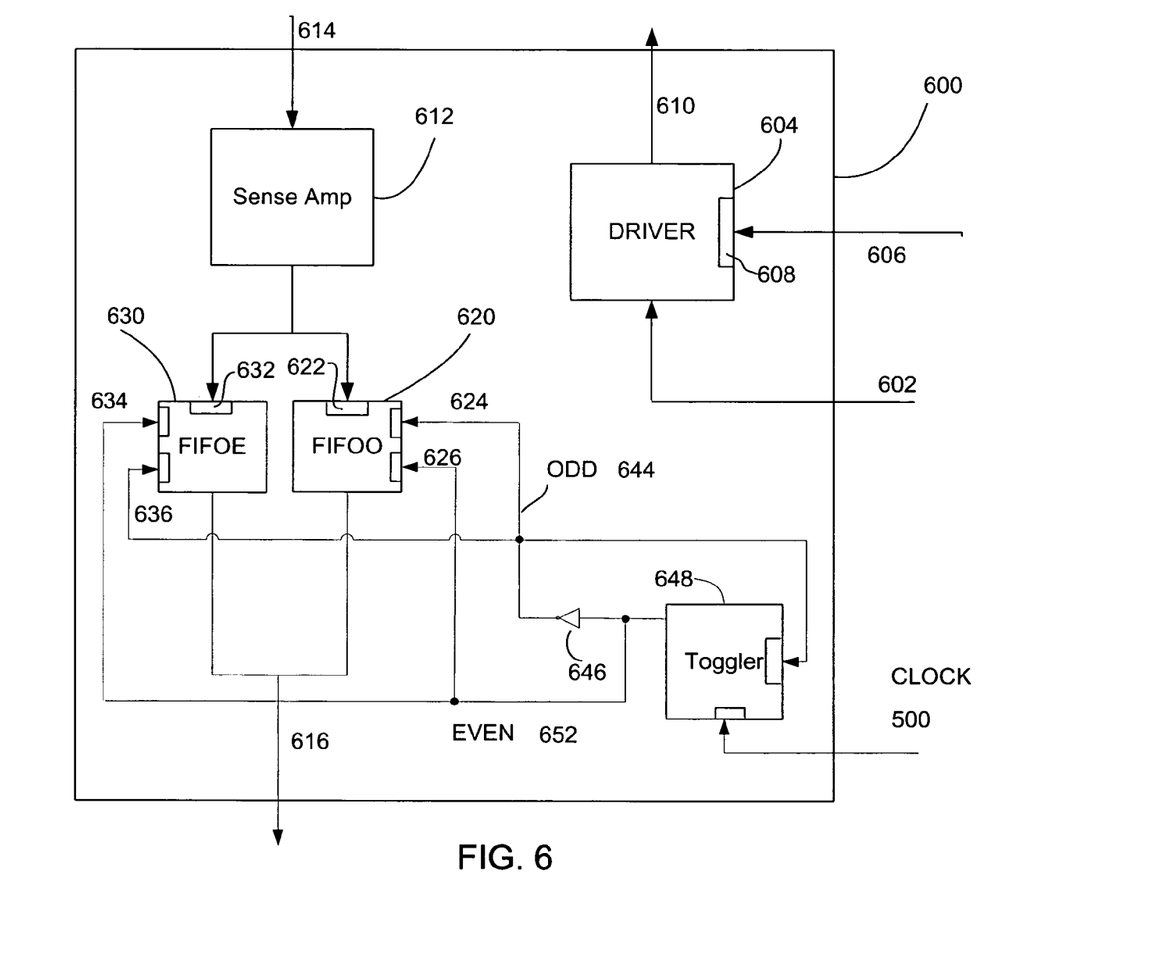
FIG. 6 is a block diagram of a bus interface unit for use with the split bus.

FIG. 6 is a block diagram of a BIU 600 used to write messages to, and read messages from, a bus segment 402. Messages 602 from a processing unit of the bus agent with which the BIU 600 is associated that are to be transmitted onto the bus segment 402 are received at a bus driver 604 within the BIU. The driver 604 contains a write enable input 608 that allows the driver 604 to output messages to the bus segment only when a positive value is present at the input. This write enable input 608 is enabled by a signal 606 received from the bus arbiter responsible for traffic on the bus segment 402. For example, if the BIU 600 is contained within the bus agent 410 connected to segment 402, the signal 606 is enabled only when there are no higher priority agents or drivers that attempt to write a message to the bus segment.

The CLOCK signal 500, the flip-flop 648 and the inverter 646 can be combined to generate a signal, EVEN, 652, that corresponds to those CLOCK phases that are of even parity and to generate a signal, ODD 644 that corresponds to those CLOCK phases that are of odd parity. The EVEN and ODD signals are then used to load messages read from the bus 400 in a manner that maintains a cache coherence among the bus agents connected to the bus.

Messages 614 received from the bus segment 402 are read into a sense amp 612 and sent to an input 622 or 632 of a FIFO buffer 620 and 630, respectively. Each FIFO 620 and 630 receives a load signal 624 and 634, respectively, that controls when a message at its input 622 or 632 is loaded into the FIFO, and this load signal allows a message to be loaded into the FIFO at the rising edge of the CLOCK signal. For FIFOO 620 the LOAD input 622 is driven by the ODD signal 644 and therefore messages written during odd parity clock cycles are loaded into the FIFOO 620. The LOAD input 632 for FIFOE 630 is triggered by the EVEN signal 652, and therefore the FIFOE loads messages written during even parity clock cycles.

FIFOO 620 also can receive an output enable signal 626, which is driven by the EVEN signal 652 and an input enable signal 624 that is driven by the ODD signal 650. FIFOE 630 receives an output enable signal 636 driven by the ODD signal 644 and an input enable signal 634 driven by the EVEN signal 652. For BIUs connected to bus segment 402, the output enable signal 626 of FIFOO 620 is driven by the EVEN signal 652 and the signal 624 is disabled, while the output enable signal 636 of FIFOE 630 is driven by the ODD signal 644 and the signal 634 is disabled. BIUs connected to bus segment 404 have the sense of their output enable signals reversed. That is, for BIUs connected to segment 404 FIFOO 620 has its output enable signal driven by the ODD signal 644 while FLFOE, 630, has its OE input driven by the EVEN signal 652. By reversing the sense of the output enable signals for the FIFOs for BIUs on the each half of the split bus, the proper ordering of messages is maintained on both halves of the split bus.

The logic behind reversing the sense of the OE for the FIFOs is as follows. The two segments 402 and 404 of the split bus 400 write only on alternate parity clock cycles. Therefore, for each bus segment 402 and 404, if a message is received that has the parity that is opposite the parity of messages written by bus agents connected to that segment, then the received message must have been written by the other bus segment, and the received message must have been written at least one clock cycle earlier than the current clock cycle. Because the opposite parity message was written earlier it should be processed earlier to maintain the cache coherence.

Since the clock used for split bus 400 can run at more than twice the rate of the maximum, RC-limited, rate at which the single bus 302 and 304 operates, the bandwidth of the split bus 400 is at least as fast as that of the non-split bus. However, if the clock is running at a higher multiple than two, then the bandwidth is correspondingly higher. Furthermore, additional logic can be added to allow the FIFO buffers 620 and 630 to allow reading of messages from the present half clock cycle if, and only if, there are no messages waiting from the previous half cycle. That is, for a BIU 600 if there are no messages in FIFOO 620, then messages may be read immediately from FIFOE 630. These messages will be from other agents connected to the same bus segment to which the BIU 600. The effect of this logic is to allow messages that originate on one half of the bus to flow to other agents on the same half bus at double speed. The combination of the higher clock rate and the ability for each half of the bus to work at double the speed of the combination guarantees that the overall bus throughput bandwidth is increased.

Figure 7:
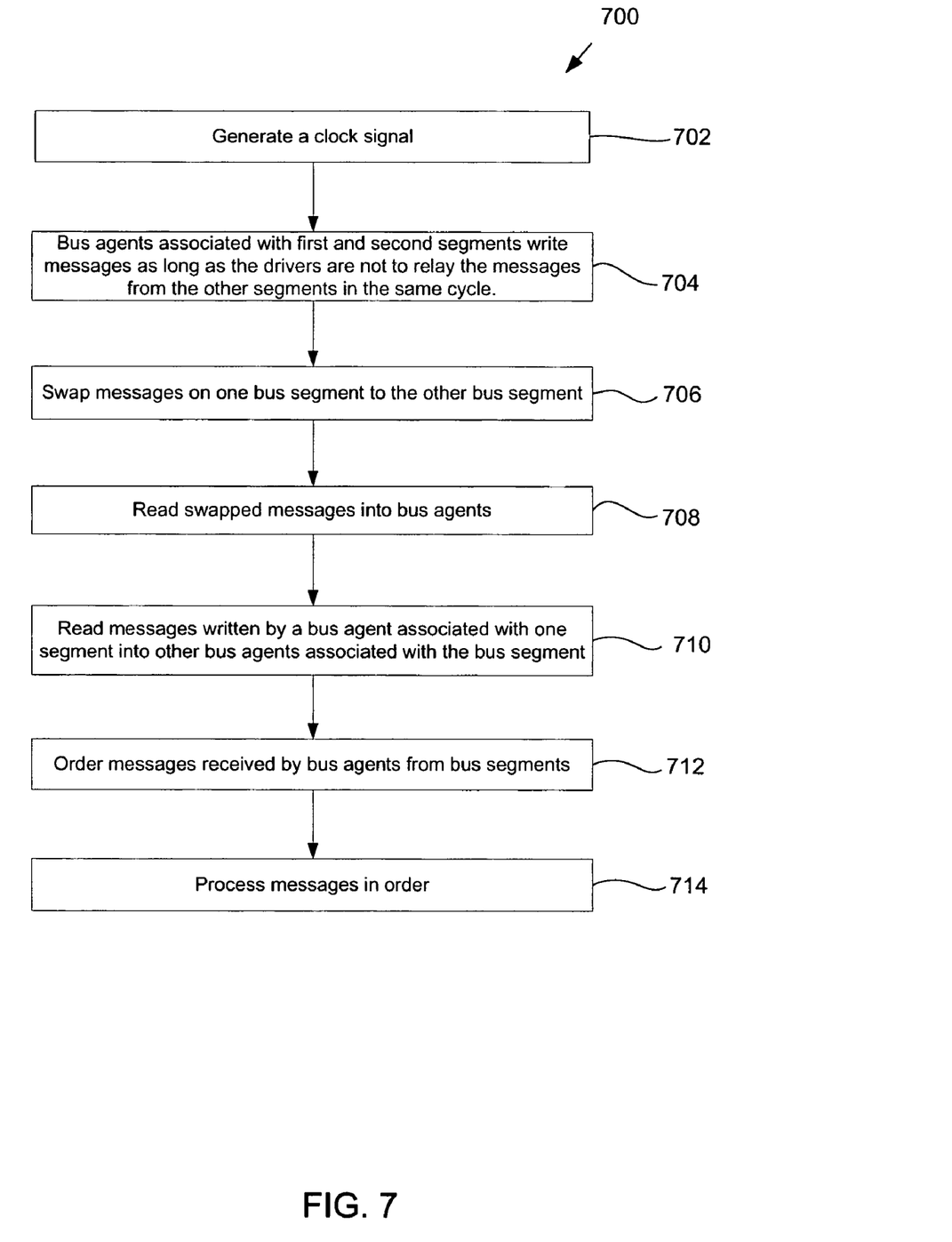
FIG. 7 is a flow chart of a process of managing data traffic on a split bus.

Referring to FIG. 7, a process 700 for managing data traffic on a split bus having a first bus segment and a second bus segment includes generating a common clock signal (step 702). Bus agents operably coupled to the first and second bus segments are triggered to write messages to their associated bus segments as long as the drivers are not to relay messages from the other bus segments in the same cycle. (step 704). Messages written by a bus agent coupled to the first bus segment can be read by other bus agents coupled to the first bus segment, and messages written by a bus agent coupled to the second bus segment can be read by other bus agents coupled to the second bus segment. Messages written to one bus segment are swapped to the other bus segment (step 706). For example, messages written to the first bus segment are transferred to the second bus segment and messages written to the second bus segment are transferred to the first bus segment. In one implementation, messages are swapped from one bus segment to the other bus segment one clock cycle after they were written to the one bus segment. In case a bus agent attempt to write a message to its associated bus segment at the same time a message is swapped from the other bus segment, the swapped message will be placed on the segment and the bus agent will wait to write the message.

Messages that have been swapped from one bus segment to the other bus segment are read by bus agents operably coupled to the other bus segment (step 708), and messages written by a bus agent associated with one segment are read into other bus agents associated with the associated bus segment (step 710). In one implementation, messages written by bus agents associated one bus segment are read into a first queue, and messages that have been swapped from the other bus segment are read into a second queue. For example, the messages read into the first and second queues can be read intot the queues during alternating clock cycles. Then, the messages can be read of the first and second queues in a pre-determined order. Thus, messages read from a bus segment by a bus agent are ordered sequentially for processing within the bus agent, and the order of the messages is identical for all bus agents coupled to both the first and second bus segments (step 712). Finally, the messages, as ordered, are processed by the bus agents (step 714), e.g., by a processor and/or local cache within the bus agent.

Implementations of the various techniques described herein may be implemented in digital electronic circuitry, or in computer hardware, firmware, software, or in combinations of them.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. The processor and the memory may be supplemented by, or incorporated in special purpose logic circuitry.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and electrical circuitry forming a communications device (e.g., a modem, communications switch, or optical-electrical equipment).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components.

While certain features of the described implementations have been illustrated as described herein, modifications, substitutions, and changes can be made. Accordingly, other implementations are within scope of the following claims.

What is claimed is:

1. A method of managing data traffic among first bus agents operably coupled to an associated first bus segment and second bus agents operably coupled to an associated second bus segment separated from the first bus segment, the method comprising:
  generating a common clock signal:
  triggering the first bus agents and the second bus agents to write messages to their associated bus segments;
  transferring messages written to the first bus segment to the second bus segment;
  transferring messages written to the second bus segment to the first bus segment;
  reading messages on the first bus segment into the first bus agents;
  reading messages on the second bus segment into the second bus agents; and
  processing messages read into the first and second bus agents in an identical order,
  wherein reading messages on the first or second bus segment into a bus agent associated with the first or second bus segment comprises:
    receiving messages written by bus agents associated with the first or second bus segment into a first queue; and receiving messages written by bus agents associated with the first or second bus segment into a second queue.

2. The method of claim 1,
wherein triggering the first bus agents and the second bus agents to write messages occurs during a first parity of the clock signal and
wherein transferring messages written to the first bus segment to the second bus segment and transferring messages written to the second bus segment to the first bus segment occurs during a second parity of the clock signal.

3. The method of claim 1, wherein messages are received into the first and second queues during alternating cycles of the clock signal.

4. The method of claim 1, further comprising reading messages out of the first and second queues during alternating cycles of the clock signal.

5. The method of claim 1,
wherein triggering the first bus agents to write messages occurs during a first parity of the clock signal and
wherein triggering the second bus agents to write messages occurs during a second parity of the clock signal.

6. The method of claim 1, wherein messages are transferred from the first bus segment to the second bus segment during cycles of the clock signal that succeed cycles of the clock signal in which the first bus agents are triggered to write the messages to the first bus segment.

7. The method of claim 1, wherein at least one first bus agent and at least one second bus agent comprises a processor and a local cache.

8. The method of claim 1, wherein the bus agents are located in a system-on-a-chip.

9. The method of claim 5, further comprising arbiting the order of messages written to and transferred to the first bus segment.

10. The method of claim 5, wherein if a first bus agent is triggered to write a message to the first bus segment during the same cycle of the clock signal when a message is transferred to the first bus segment, placing the message transferred to the first bus segment on the first bus segment.

11. A system comprising:
a first bus segment operably coupled to one or more first bus agents, wherein the first bus agents are configured for writing messages to the first bus segment and reading messages from the first bus segment;
a second bus segment separate from the first bus segment operatively coupled to one or more second bus agents, wherein the first bus agents are configured for writing messages to the first bus segment and reading messages from the first bus segment;
first electrical circuitry operably coupled to the first bus segment and the second bus segment and configured to read messages written on the first bus segment and to write the messages onto the second bus segment;
second electrical circuitry operably coupled to the first bus segment and the second bus segment and configured to read messages written on the second bus segment and to write the messages onto the first bus segment;
a first arbiter operably coupled to the first bus agents and to the first bus segment, wherein the arbiter is configured to for determining an order of messages written to the first bus segment; and
a second arbiter operably coupled to the second bus agents and to the second bus segment, wherein the arbiter is configured to for determining an order of messages written to the first bus segment.

12. The system of claim 11, wherein the system is located on a system-on-a-chip.

13. The system of claim 11, wherein each bus agent comprises a processor and a local cache.

14. The system of claim 11, further comprising a main memory operably coupled to the first bus segment and the second bus segment.

15. The system of claim 11, wherein the first and second bus agents are configured for writing messages during alternating clock cycles.

16. The system of claim 11, wherein lengths of the first and second bus segments are identical to within about 10 percent.

17. A system comprising:
a first bus segment operatively coupled to one or more first bus agents, wherein the first bus agents are configured for writing messages to the first bus segment and reading messages from the first bus segment;
a second bus segment separate from the first bus segment operatively coupled to one or more second bus agents, wherein the first bus agents are configured for writing messages to the first bus segment and reading messages from the first bus segment;
first electrical circuitry operably coupled to the first bus segment and the second bus segment and configured to read messages written on the first bus segment and to write the messages onto the second bus segment;
second electrical circuitry operably coupled to the first bus segment and the second bus segment and configured to read messages written on the second bus segment and to write the messages onto the first bus segment,
wherein the first bus agents comprise an even queue configured for receiving messages written by the first bus agents and an odd queue configured for receiving messages written by the second electrical circuitry,
wherein the second bus agents comprise an odd queue configured for receiving messages written by the second bus agents and an even queue configured for receiving messages written by the first electrical circuitry, and
wherein the first and second bus segments comprise electrical circuitry configured for outputting messages from the odd and even queues during alternating clock cycles.

18. The system of claim 17, wherein the system is located on a system-on-a-chip.

19. The system of claim 17, wherein each bus agent comprises a processor and a local cache.

20. The system of claim 17, further comprising a main memory operably coupled to the first bus segment and the second bus segment.

21. The system of claim 17, wherein the first and second bus agents are configured for writing messages during alternating clock cycles.

22. The system of claim 17, wherein lengths of the first and second bus segments are identical to within about 10 percent.

23. A system comprising:
a first bus segment operatively coupled to one or more first bus agents, wherein the first bus agents are configured for writing messages to the first bus segment and reading messages from the first bus segment;
a second bus segment separate from the first bus segment operatively coupled to one or more second bus agents, wherein the first bus agents are configured for writing messages to the first bus segment and reading messages from the first bus segment;
first electrical circuitry operably coupled to the first bus segment and the second bus segment and configured to read messages written on the first bus segment and to write the messages onto the second bus segment;

second electrical circuitry operably coupled to the first bus segment and the second bus segment and configured to read messages written on the second bus segment and to write the messages onto the first bus segment, wherein each of the first bus agents comprise electrical circuitry configured for placing messages read from the first bus segment in an order for processing; and wherein each of the second bus agents comprise electrical circuitry configured for placing messages read from the second bus segment in the same order for processing.

24. The system of claim 23, wherein the system is located on a system-on-a-chip.

25. The system of claim 23, wherein each bus agent comprises a processor and a local cache.

26. The system of claim 23, further comprising a main memory operably coupled to the first bus segment and the second bus segment.

27. The system of claim 23, wherein the first and second bus agents are configured for writing messages during alternating clock cycles.

28. The system of claim 23, wherein lengths of the first and second bus segments are identical to within about 10 percent.

* * * * *